United States Patent [19]

Longobardi et al.

[11] Patent Number: 5,742,725
[45] Date of Patent: Apr. 21, 1998

[54] METHOD AND APPARATUS FOR FORMING FIBRE OPTIC ATTENUATORS WITH SPECTRAL RESPONSE INDEPENDENT OF THE WAVELENGTH

[75] Inventors: Enzo Longobardi, Milan; Lucio Duca, Cusano Milanino; Antonio Menzaghi, Varese, all of Italy

[73] Assignee: Optotec S.p.A., Milan, Italy

[21] Appl. No.: 767,541

[22] Filed: Dec. 16, 1996

[30] Foreign Application Priority Data

Dec. 18, 1995 [IT] Italy ................... MI95A2659

[51] Int. Cl.$^6$ ................................................ G02B 6/02
[52] U.S. Cl. .................................. 385/140; 385/123
[58] Field of Search ........................... 385/1, 15, 39, 385/50, 123, 140; 359/900

[56] References Cited

U.S. PATENT DOCUMENTS 4,728,170 3/1988 Robertson ..................... 385/140
4,884,859 12/1989 Yamamoto et al. .............. 385/140
5,321,790 6/1994 Takahashi et al. ............... 385/140

Primary Examiner—John D. Lee
Attorney, Agent, or Firm—Hedman, Gibson & Costigan, P.C.

[57] ABSTRACT

A fibre optic attenuator (201) with spectral response independent of the incident radiation wavelength is formed by a method comprising a controlled series of compressive stressing and subsequent relaxation, or of relaxation alone, of the core of an optical fibre (30) (which can be of standard type or special type), which is simultaneously softened by local heating produced by a heat source. The application of further heating, in the absence of mechanical stressing of the deformed optical fibre (30), facilitates the attainment of the required attenuation.

14 Claims, 7 Drawing Sheets

METHOD AND APPARATUS FOR FORMING FIBRE OPTIC ATTENUATORS WITH SPECTRAL RESPONSE INDEPENDENT OF THE WAVELENGTH

This invention relates to a method for forming a fibre optic attenuator with spectral response independent of the incident radiation wavelength, and to the apparatus used for said forming. Attenuator construction methods are known involving permanent geometrical deformation of the core of a portion of optical fibre of standard type by the action of a controlled electrical discharge, combined with suitable axial and transverse or composite mechanical stressing, accompanied by continuously recording the level of attenuation of the optical power emitted by an optical source positioned at one end of the fibre portion. It is also known that wavelength independence of the attenuator spectral response is due to the controlled superposing of two misalignment effects, namely axial and angular, of the core of an optical fibre of standard type (ie of high numerical aperture and high cut-off frequency) during manipulation.

It is however clear that to obtain constant spectral response of the attenuator, an optical fibre of special type must be used in that the first higher mode has to be attenuated as this would generate interference with the fundamental mode and cause the attenuation to vary with wavelength.

Moreover, the technique of inducing deforming mechanical stresses introduces an operational randomness and makes the achieving of the required attenuation dependent on operator dexterity.

An object of the present invention is to provide a method for forming a fibre optic attenuator which overcomes the aforesaid drawbacks by achieving an attenuator the attenuation of which is independent of the incident radiation wavelength (within a narrow tolerance in the wavelength range between 1200 nm and 1650 nm), using optical fibres of either standard or special type.

A further object of the present invention is to provide a method for forming an attenuator of the aforesaid type, in which a more deterministic correlation can be achieved compared with known solutions, together with a quantitative (and not only qualitative) correspondence between the specific causes (manual stressing and deformation of the fibre core) and the effects obtained (increase in attenuation and its independence from the incident radiation wavelength).

A further object of the invention is to provide an inventive solution in the attenuator formation method for improving, compared with known methods, the interfacing between an attenuator formed from special type fibre and the outside world.

A further object of the invention is to form an attenuator by a method of simple and economical implementation which does not require the use of complicated or particularly costly techniques, which can be automated and which enables the time for forming the attenuating region of the fibre core to be substantially reduced.

These and further objects are attained by a method for forming a fibre optic attenuator with spectral response independent of the incident radiation wavelength, in accordance with claim 1.

The invention also provides an apparatus for forming a fibre optic attenuator with spectral response independent of the incident radiation wavelength, in accordance with claim 14.

Advantageously, it has been found that by a controlled series of compressive stressing and successive relaxation or just relaxation of the core of an optical fibre (of either standard or special type), softened by local heating produced by a heat source of any kind, an attenuation is obtained having spectral response constant with the incident radiation wavelength.

In addition, the application of further heating, in the absence of mechanical stressing of the deformed optical fibre, facilitates the achievement of the required attenuation.

Wavelength independence is achieved by suppressing the modal interference which arises in the cavities defined by the connections between the fibres and the signal attenuation region by one of the following methods:

use of optical fibres with special characteristics, such as a cut-off wavelength much lower than the lowest operating wavelength and a numerical aperture higher than that of standard monomodal fibres;

suppressing higher modes by the use of resins of high refractive index (higher than the refractive index of the optical fibre cladding) on a fibre previously reduced in diameter, so as to favour the emergence of optical power associated with the higher modes.

Joining a special characteristic fibre to standard type optical fibres such that the standard fibre interfaces the analogous fibre forming the connection connectors also minimizes connection losses between the attenuator and the external line of the apparatus. This further ensures that the spectral response is independent of wavelength, seeing that the amplitude of the relative oscillations of said spectral response depends on the extent of the connection losses.

Widening the mode field obtained by heating the two ends of the special attenuated fibre enables the mode field diameter of said fibre to be adapted to that of the standard connection fibre, to achieve an attenuator with only special type optical fibre with the mode field diameter widened at the two ends.

This facilitates attenuator coupling to the apparatus connection line with low connection losses and, as already stated, enables wavelength independence to be maintained.

Because of these characteristics the attenuator obtained does not generate modal noise at the connections when connected to the apparatus line.

Additionally, the apparatus for forming said attenuator, according to the present invention, offers a technical solution which, in terms of signal losses at the connections and compared with the known art, improves interfacing between an attenuator using special type fibre and the outside world.

Finally, as a modification to the aforesaid embodiments, the use of a standard type fibre treated by compression and softening results in a small-dimension attenuator in which attenuation is constant with incident radiation wavelength.

In particular the application of compressive stresses to a fibre softened by local heating enables attenuators to be obtained which are compact (with a size of the order of one centimeter) and hence easy to install, and having a spectral response independent of wavelength. Theoretically there are no limits to the attenuation obtainable by a single local deformation.

Further objects and advantages of the present invention will be apparent from the description given hereinafter with reference to the accompanying drawings, which are provided by way of non-limiting example and in which.

Figure 5A:
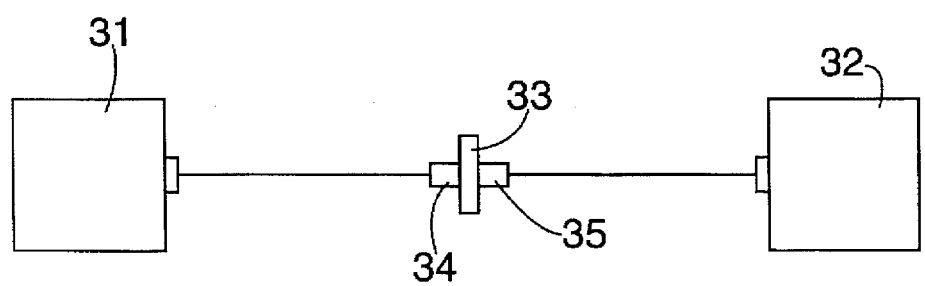
Figure 5B:
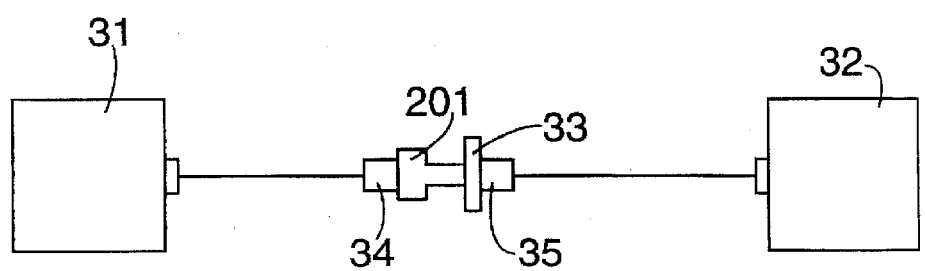
Figure 6A:
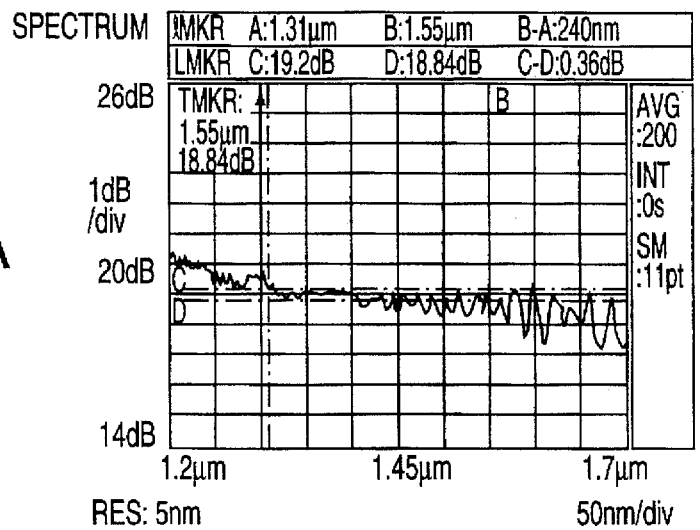
Figure 6B:
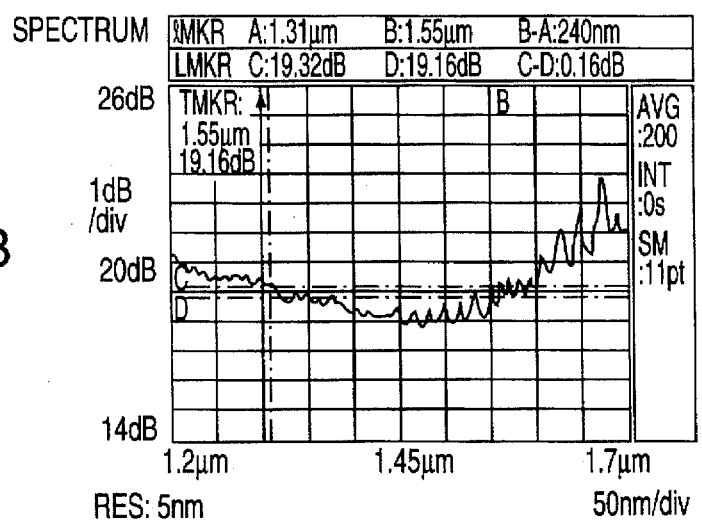
Figure 6C:
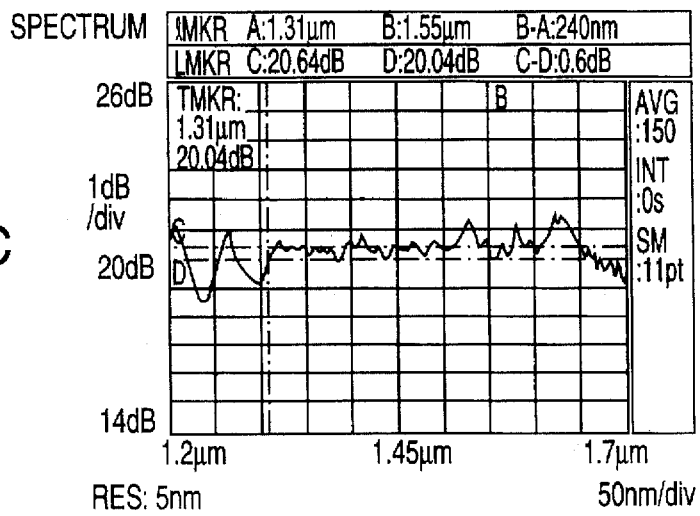
Figure 7A:
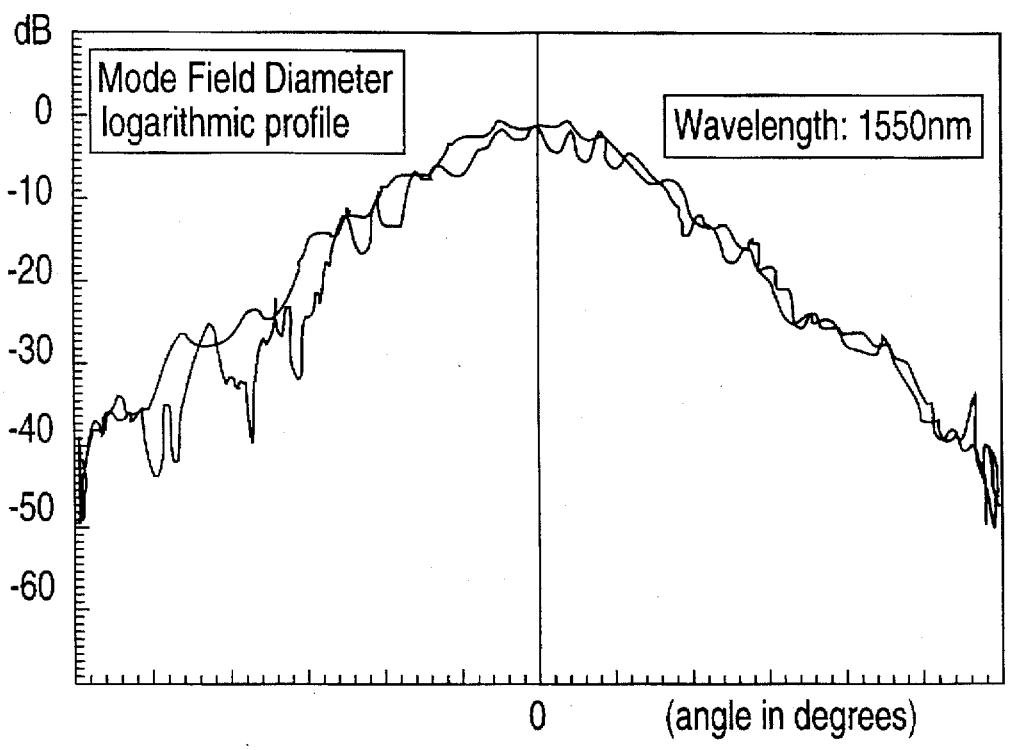
Figure 7A:
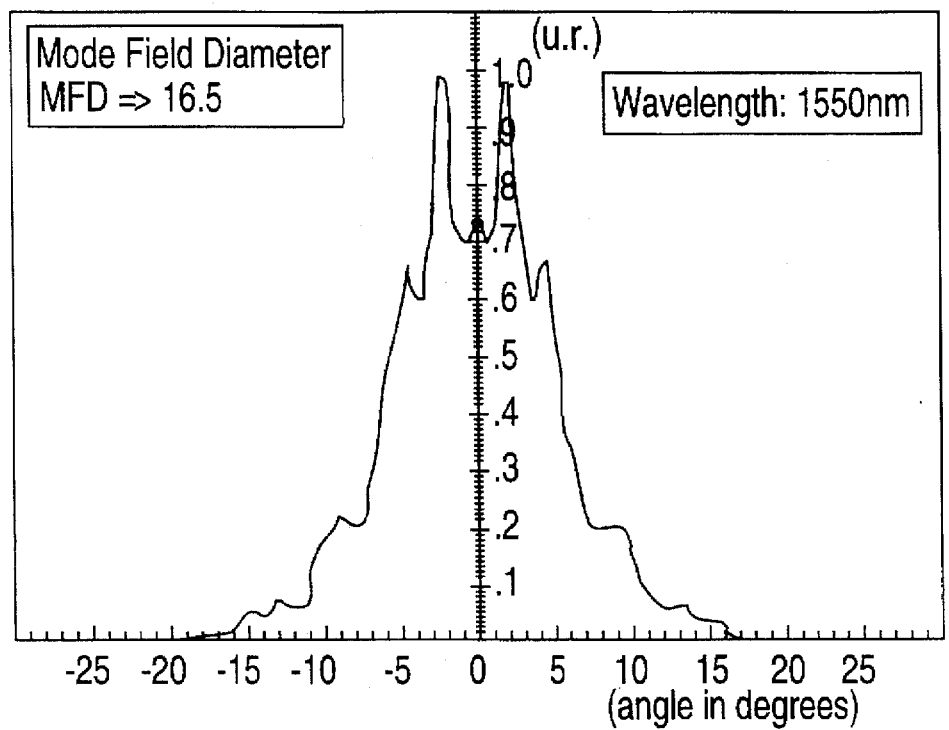
Figure 7B:
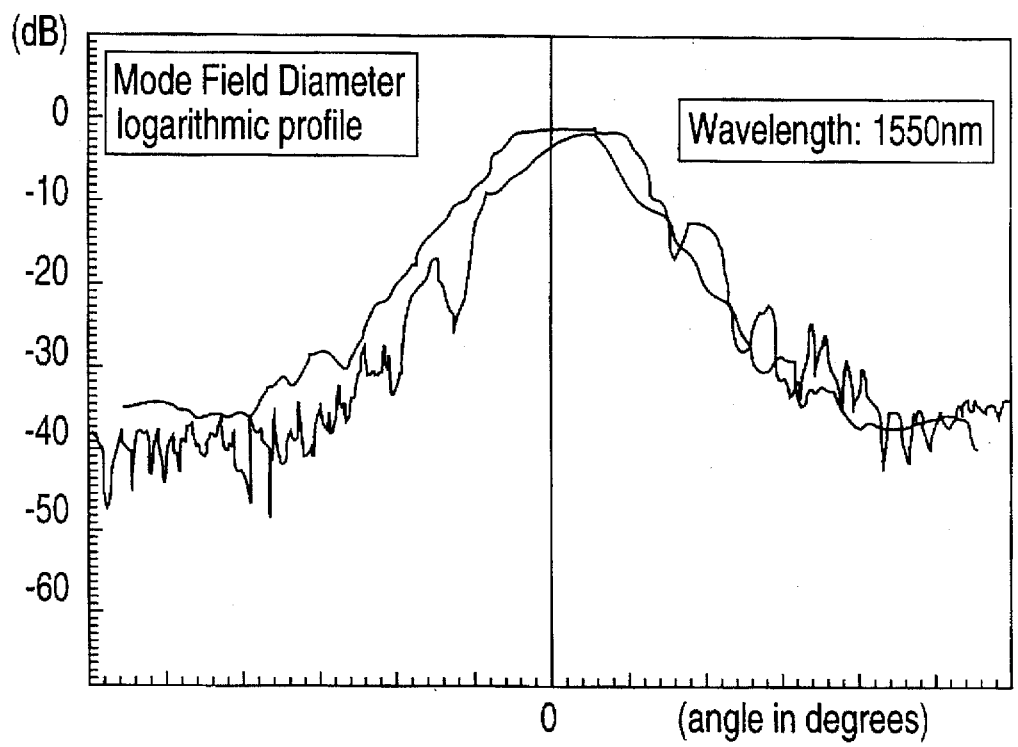
Figure 7B:
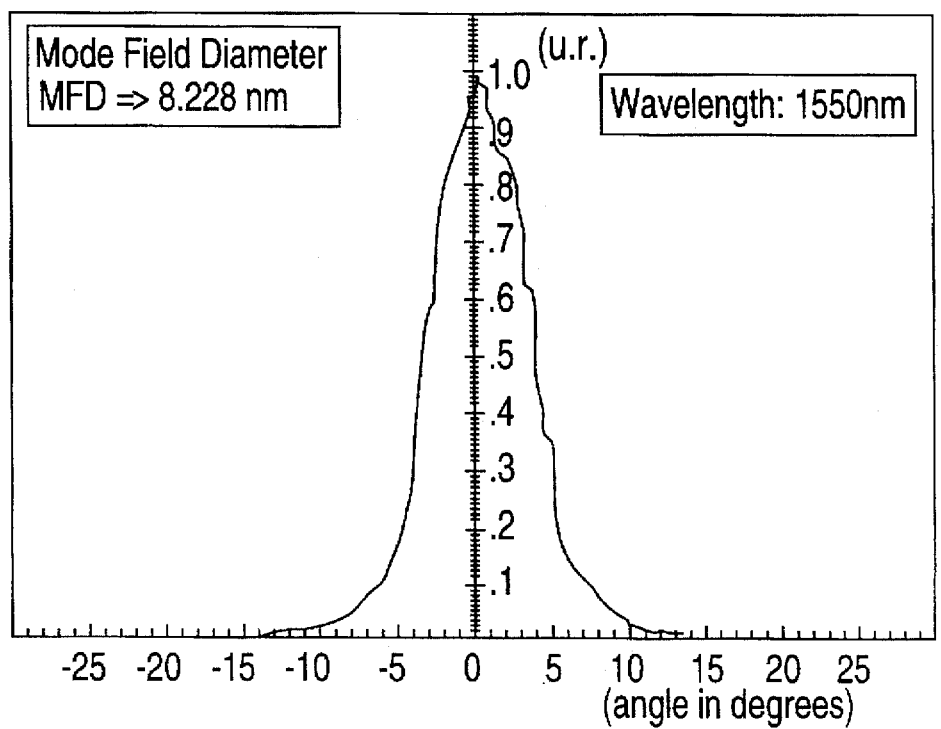
Figure 7C:
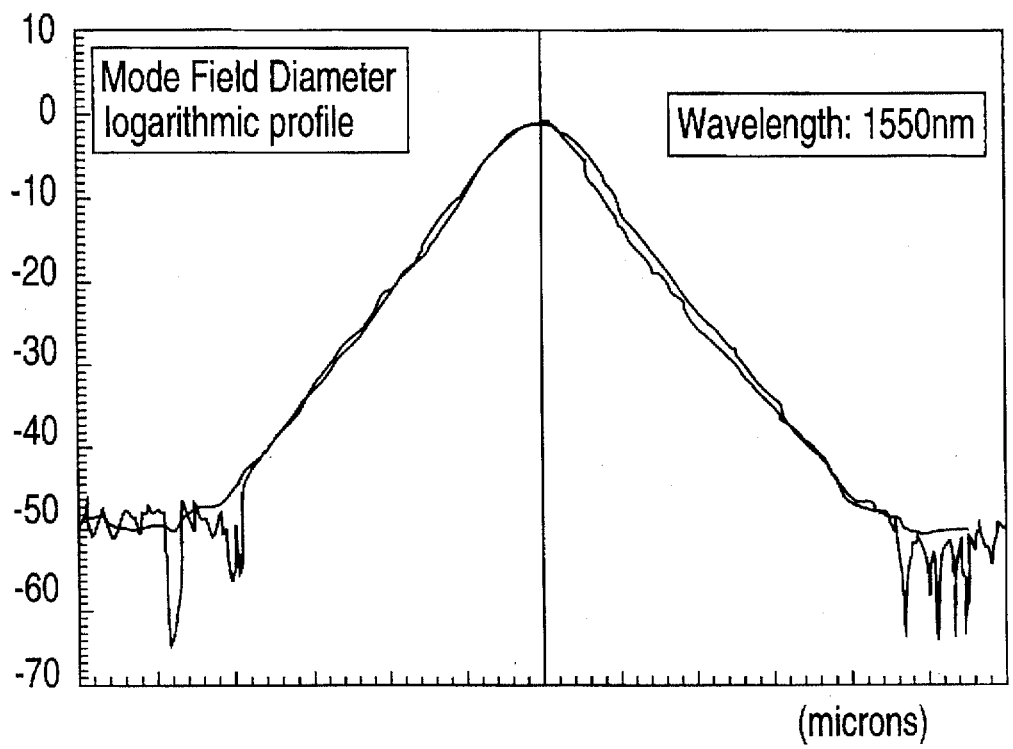
Figure 7C:
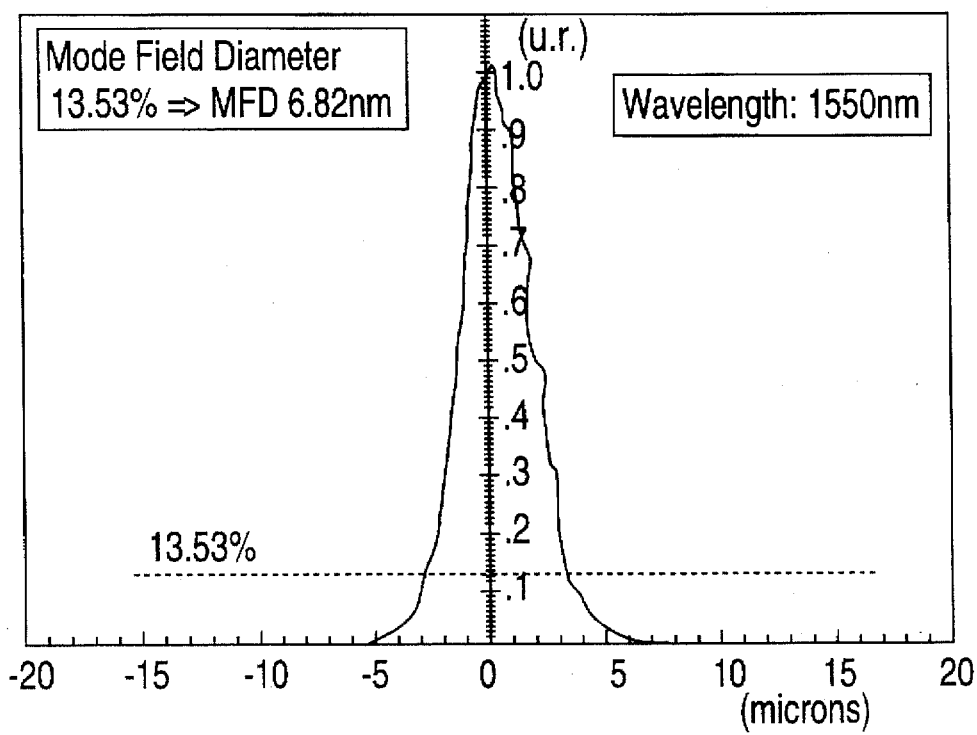

FIGS. 5a and 5b show a block diagram relative to the two configurations of a bench for measuring the spectral attenuation of an attenuator within the entire wavelength range of interest (between 1200 nm and 1650 nm), according to the present invention; specifically, FIG. 5a shows the block diagram of a reference test bench, whereas FIG. 5b shows the block diagram of the same bench with the attenuator in the measurement position, according to the present invention;

FIGS. 6a, 6b, 6c illustrate schematically, in the form of cartesian graphs, the variation in spectral attenuation (in decibels) relative to an attenuator formed from optical fibre of special type joined at its ends to optical fibre of standard type, to an attenuator formed from optical fibre of special type with an enlarged mode field diameter at its ends, and to an attenuator formed from optical fibre of standard type, respectively;

FIGS. 7a, 7b, 7c illustrate schematically, in cartesian coordinates, the mode field profiles (in decibels and in linear reference units) measured at different points of an attenuating region of the optical fibre formed by the method of the present invention; specifically, the mode field profiles relate respectively to the centre of the attenuating region, to the end of the attenuating region, and a few centimeters from the centre of the attenuating region.

Figure 1:
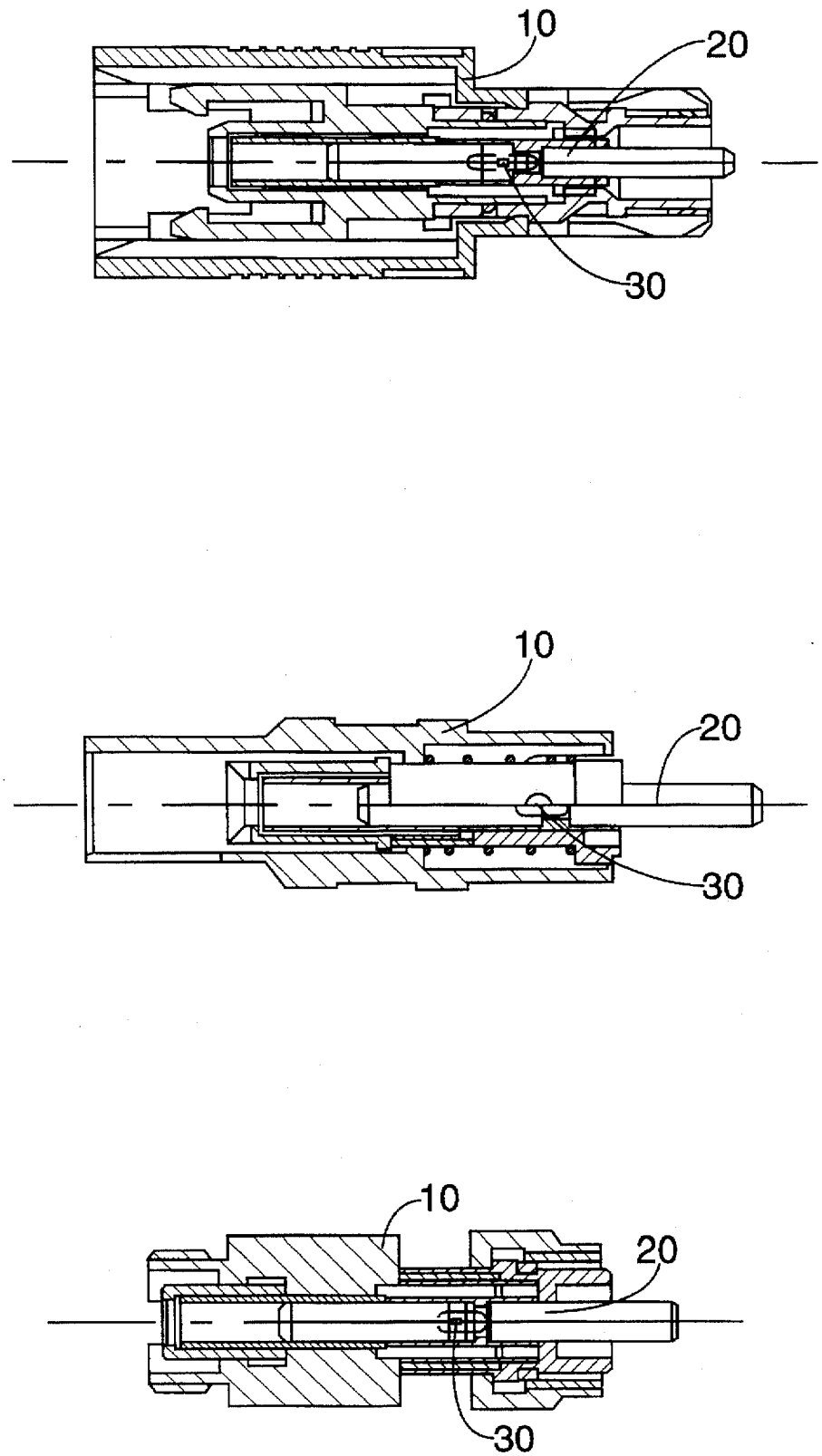
FIG. 1 shows three possible configurations (by way of non-limiting example) of attenuators according to the present invention, compatible with three different commercially available connectors.

In FIG. 1, the reference numeral 10 indicates the outer casing of the attenuator, 20 the attenuator inner body responsible for the attenuation, and 30 the optical fibre within which the incident signal is attenuated.

Figure 2:
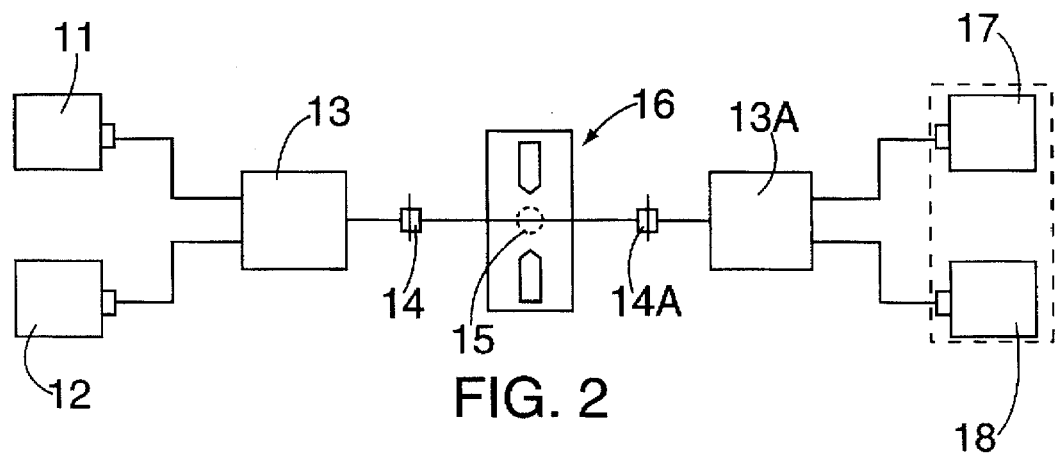
FIG. 2 is a partial block diagram of the apparatus used for implementing the method of the present invention.

With reference to the block diagram of the apparatus of FIG. 2, the optical fibre fusion and manipulation block is indicated overall by 16.

The block 16 can be controlled by a human operator to subject an optical fibre to manual and mechanical stress during fusion. Alternatively, the block 16 can be controlled by an automated programmable electronic system.

The outputs of two light emitting diodes (LEDs or laser diodes), indicated respectively by 11 and 12, are connected to two inputs of a wavelength division multiplexer 13.

The diodes 11 and 12 emit optical signals having for example a wavelength of 1310 nm and 1550 nm respectively (typical wavelengths at which the optical fibre used is monomodal). The single output of the multiplexer 13 is connected via a connector 14 to one end of a piece 15 of optical fibre, inserted into the block 16.

The other end of the piece 15 is connected via a connector 14A to the input of a second wavelength division multiplexer 13A. Finally, the two outputs of the multiplexer 13A are connected to two sensors 17, 18 for the optical signal received, respectively for example for a wavelength of 1310 nm and for a wavelength of 1550 nm, the sensors being chosen so that their spectral responses are identical.

Figure 3:
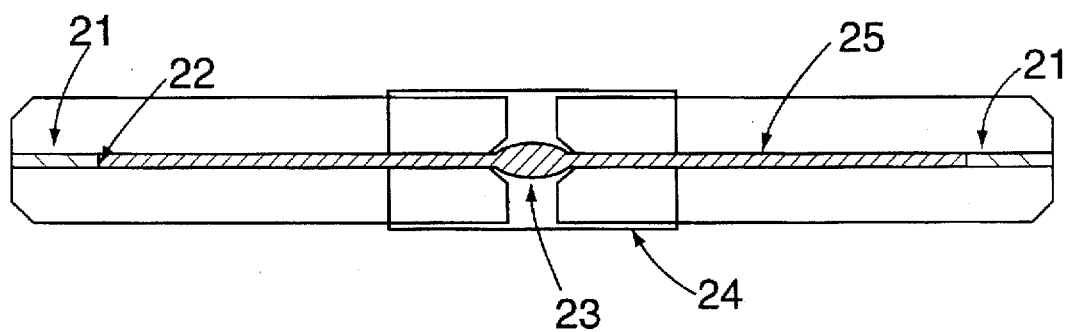
FIG. 3 is a schematic configuration showing the attenuating body of an attenuator formed from optical fibre of special type joined at its ends to optical fibre of standard type, according to the present invention.
Figure 4:
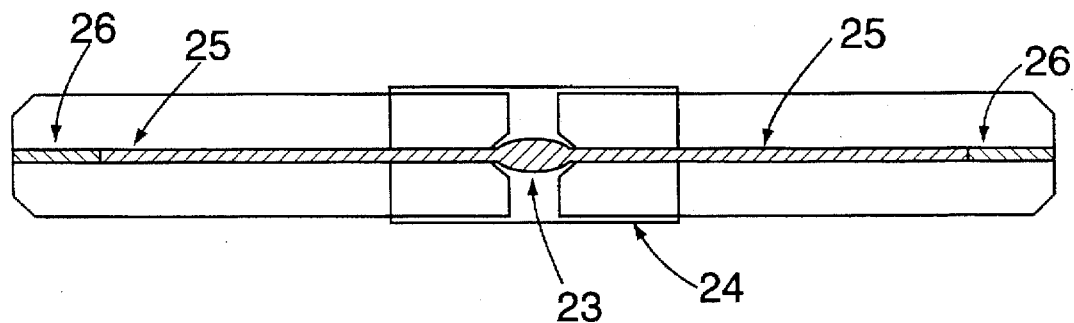
FIG. 4 is a schematic configuration showing the attenuating body of an attenuator formed from optical fibre of special type having a mode field diameter widened at the ends, according to the present invention.

In FIGS. 3 and 4, the reference numeral 21 indicates pieces of optical fibre of standard type, 22 indicates a fusion joint, 23 indicates attenuation regions, 24 indicates fixing elements for the ferrules containing the optical fibres, 25 indicates pieces of optical fibre of special type and 26 indicates pieces of optical fibre of special type having an enlarged mode field diameter at their ends.

Finally, in FIGS. 5a and 5b, the reference numeral 31 indicates a white light source, 32 indicates an optical spectrum analyzer, 33 indicates a measurement sleeve, 34 and 35 indicate reference pins, and 201 indicates an attenuator under measurement.

To form a small-dimension optical attenuator of spectral response independent, within a narrow tolerance, in the range of 1200 nm to 1650 nm, the following steps are carried out, it firstly being necessary to heat the optical fibre (for example by an electric arc powered with a current suitable for the type of fibre for a predetermined time) until it softens.

This heating produces a region 23 in the optical fibre 15, arranged to attenuate the optical signal.

Merely softening the fibre in the absence of stress produces a reduction in attenuation and regularizes the forces within the region 23.

The optical fibre 15 is then manipulated by the operator by the application of manual compressive stress, verifying in real time the progressive increase in attenuation compared with its initial value by that part of the apparatus shown in FIG. 2, used to effect active monitoring at two wavelengths of interest in telecommunications.

The multiplexer 13 combines the two signals emitted by the diodes 11, 12, feeding them simultaneously to the optical fibre piece 15 via a monomodal optical fibre.

The second multiplexer 13A divides the composite signal into its two original components, feeding them separately to the two sensors 17, 18, which measure the optical power transmitted by the fibre at the two wavelengths of interest.

During the manipulation of the optical fibre 15, the application of a compressive force generates a region 23 within the heated fibre portion which, while maintaining the original rectilinear geometry, provides a predetermined attenuation for the optical signal along the fibre 15.

The increase in the diameter of the attenuation region compared with that of the rest of the fibre 15 is in the form of a homothetic transformation, ie without altering the optical-geometrical characteristics achieved in each section of the fibre 15.

Superheating the attenuation region in the absence of mechanical stressing facilitates attainment of the desired attenuation value (in those cases in which this value cannot be achieved by mechanical compression alone).

As a result of the combined heating and compressive action, in the fibre piece 15 concerned there is diffusion of the dopant from the core towards the cladding, simultaneously with enlargement of the diameter of the fibre 15.

The core deformed in this manner allows multi-mode propagation. As it is well known that an axial misalignment of the fibre piece 15 causes spectral attenuation decreasing with wavelength, and that angular misalignment causes spectral attenuation increasing with wavelength, the operator, by constantly monitoring the response of the fibre 15 both at low and at high wavelength, is able to obtain a spectral attenuation which is independent of wavelength by combining axial with angular misalignment.

To form an attenuator, the fibre piece 15 is inserted into a mechanical adaptor 10, the ends of which are lapped and polished to achieve low-loss connections.

The attenuators obtained are of small dimensions (length of the order of one centimeter) and differ from each other by the different type of optical fibre 30 used or, for identical fibre 30, by the subsequent treatment undergone by the fibre 30 to achieve controlled attenuation of the optical signal.

The common objective is to reduce to a minimum the connection losses between the treated fibre piece 30 and the optical fibres used for connection to the line, in order to limit oscillations of the attenuator spectral response due to modal coupling.

To reduce connection losses, optical fibres 30 of similar geometrical characteristics are coupled together, the relative misadaptions being the main cause of attenuation.

In certain applications, optical fibres of special type are used having a high numerical aperture and a low cut-off wavelength, in order to attenuate the first higher mode, which, by generating interference with the fundamental mode, would result in undulated variation in attenuation with wavelength.

By way of example, a description is given hereinafter of the successive operations involved in assembling three different types of attenuator, the schematic configurations of which are shown in FIG. 1 respectively.

1) Attenuator formed with optical fibre of special type joined to optical fibre of standard type.

In forming this attenuator, a piece of special type fibre 25 of suitable length is joined, after hot manipulation, to two pieces of standard type fibre 21, so that this latter interfaces with the line connection fibres which, being generally of the same type, generate low connection losses.

During the making of the two joints, it is sought to reduce as much as possible the relative attenuations at the two wavelengths of interest (for example 1310 nm and 1550 nm), at least to below 0.5 decibels for each joint, in that the sum of these losses determines the extent of oscillation in the spectral response of the attenuator.

Monitoring the joint losses is done with the aid of the wavelength division multiplexer and by sensing signals emitted by diodes, for example at 1310 nm and 1550 nm; obviously the attenuation values induced in the fibre during manipulation take account of the attenuation increase contributed by the joints.

The resultant optical fibre is inserted and fixed into an attenuator attenuating body 20, which is then lapped on both sides by the usual methods used for optical connectors.

Finally, the attenuating body 20 is assembled into the attenuator outer casing 10.

2) Attenuator formed with optical fibre of special type with mode field diameter enlarged at the end.

One of the causes of loss at an optical connection is the difference between the mode fields of the two mutually facing optical fibres, in addition to the various misalignments present between the fibre axes.

Specifically, the special type fibre 25 used in the optical attenuators has a mode field diameter of between of 5 μm and 6 μm compared with a mode field diameter of 9–10 μm for standard type optical fibre.

Consequently, if an attenuator formed with only special type fibre 25 is mounted on a connection formed with standard type fibre, a connection loss would be introduced into the circuit to the extent of 2–4 decibels greater than the intrinsic attenuation of the component, against about 0.5 decibels achieved by two couplings between two fibres of standard type.

Moreover, losses of this type are extremely variable from one connection to another, so that it would become extremely difficult to take them into account in forming the attenuator.

By heating an optical fibre above the softening point of silica (about 1600° C.), thermal diffusion of particular dopants contained in the fibre core can be induced towards the peripheral regions of the cladding. This method enables the refractive index distribution to be varied, to obtain a reduction in the refractive index within the fibre core and an increase in the mode field diameter.

After the manipulation of the special type optical fibre 25, this is in effect heated in correspondence with the junction regions by an electric arc of predetermined power or by a flame of suitable composition.

The duration of heating depends on the desired extent of mode field enlargement in the special type optical fibre 26. The resultant optical fibre is inserted and fixed into an attenuator attenuating body 20.

It is then lapped on both sides and is finally assembled into the attenuator outer casing 10.

3) Attenuator formed with optical fibre of standard type.

This construction is based on the use of a standard type optical fibre 21, which eliminates the problems (present in the first two aforedescribed embodiments) connected with incompatibility between the optical fibre within which there is optical signal attenuation and that of the connection circuit.

The fibre 21 is manipulated and made attenuating in the usual aforedescribed manner.

The fibre 21 is then pre-assembled into the attenuator attenuating body, leaving the central part (of length 2–10 μm) about the bulb 23 free, so that the diameter can then be reduced.

This is achieved by exposing the appropriate fibre portion 21 to chemical attack with hydrofluoric acid for a predetermined time, to reduce the diameter of the fibre 21 to 50–70 μm.

On termination of this operation the attacked region is coated with resin of high refractive index, after which assembly continues in the same manner (already described) as the two preceding constructions.

The assembled attenuators of the constructions described heretofore by way of non-limiting example are subjected to spectral attenuation measurements over the entire wavelength range of interest by the test bench shown schematically in FIGS. 5a, 5b.

The diagrams of FIGS. 6a, 6b, 6c are obtained by experimentally measuring, as a function of the wavelength (within the range of 1200 nm to 1700 nm) the spectral attenuation of the attenuators of the three constructions described heretofore by way of example. The horizontal axis of the diagrams of FIGS. 6a, 6b, 6c represents wavelength expressed in microns, whereas the vertical axis represents spectral attenuation expressed in decibels (dB). It can be seen that in all three cases, the spectral attenuation is relatively constant and presents minimum oscillations in particular within the wavelength range of between 1310 nm and 1550 nm (the attenuation difference at these wavelengths is 0.36 dB, 0.16 dB and 0.60 dB respectively for the three constructions of the 20 decibel attenuator already described).

The presence of oscillations in the spectral response is due to the generation of modal noise; the strong reduction in the amplitude of the oscillations within the wavelength range of interest in the case of the attenuator formed from standard type fibre should be noted.

It can therefore be considered that the spectral response is substantially flat and constant (with wavelength) from the cut-off wavelength of the optical fibre onwards, because the piece of fibre is sufficiently long not to present modal noise.

In addition the fibre core deformed by compression enables several modes to be propagated; as confirmation of this, FIG. 7a shows the variation in the optical power measured by the far field method over a central section of the bulb 23, as a function of the measurement angle.

FIG. 7b shows the said variation over a terminal section of the bulb 23, and FIG. 7c shows the near field profile of an untreated optical fibre.

The horizontal axis of FIGS. 7a, 7b, 7c represents the angular distance (in degrees) or linear distance (in microns)

from the optical fibre core, whereas the vertical axis represents the optical power of the electromagnetic field, expressed in decibels (dB), of linear profile and logarithmic profile.

In passing from an untreated fibre section to an attenuated fibre section it can be seen that the optical power associated with the fundamental mode (central lobe) is reduced within the bulb 23 in favour of the higher modes (lateral lobes of the diagram of 7a), enabled by the presence of a larger diameter core (multimodal). This multimodal situation present at the centre of the bulb 23 tends however to die out in proceeding towards the periphery, as can be noted by the reduced power level associated with the higher modes, shown on the diagram of FIG. 7c, to return to the monomodal regime after a few centimeters of optical fibre.

The attenuation mechanism arises from the transfer of power from the fundamental mode to the higher modes, which at the end of the bulb are transformed into leaky modes (strongly attenuated modes which propagate within the cladding) which are eliminated after a few centimeters because of a resin of high refractive index (higher than that of the cladding) and the presence of the primary coating of the optical fibre, which act as mode suppressors ("stripping").

For reasons of compactness, the attenuator attenuating body 20 has a length slightly greater than 2 centimeters, so that the length of the fibre 30 containing the bulb 23 does not enable the first higher mode to be sufficiently attenuated.

Consequently, in correspondence with the exit connections and/or the joints between the special type fibre 25 and the standard type fibre 21 (in a particular embodiment of the invention) modal noise is generated because of interference of the first higher mode with the fundamental mode.

To limit modal noise and obtain attenuators with limited oscillations (less than 10% of the rated attenuation) within the wavelength range of interest, it is known to use a fibre with a lower cut-off wavelength than the operating wavelength. This results in considerable attenuation of the first higher mode. Moreover, this fibre must have a numerical aperture greater than that of a monomodal standard-type fibre at the wavelengths of interest, so as to minimize coupling losses.

The first two constructions illustrated by way of example use this type of fibre (the so-called optical fibre of special type). In the third construction, the "stripping" effectiveness of the higher modes is reinforced by the reduction in the cladding diameter about the bulb and the application of a layer of high refractive index resin to this bulb.

This layer, together with the cladding, forms a second optical guide, parallel and coaxial to the main guide, within which the higher modes travelling through the cladding are conveyed. The characteristics of the method and apparatus for forming fibre optic attenuators with spectral response independent of the incident radiation wavelength according to the present invention are clear from the aforegoing description, as are the resultant advantages.

Specifically, these relate to the following aspects:
the application of compressive stresses to a heat-softened fibre followed by relaxation enables attenuators to be obtained having a spectral response independent of wavelength and quantitatively controllable by the deformation parameters (temperature, duration, direction, intensity);
suppression of modal noise is achieved in the attenuators by choosing optical fibres with a cut-off wavelength less than the lowest operating wavelength, and a numerical aperture greater than that of standard type monomodal fibres and/or by suppressing the higher modes by using resins with a high refractive index (higher than that of the fibre cladding) on a fibre previously reduced in diameter;
joining a special type fibre to standard type optical fibres and the accompanying low joint losses result in minimized connection losses between the attenuator and the connection connectors containing standard type fibres, hence facilitating coupling to the transmission system;
the enlargement of the mode field by heating at the two ends of the special type fibre enables the mode field diameter of this fibre to be adapted to that of the standard type connection fibre, consequently minimizing connection losses and improving coupling to the outside world;
within the length between the attenuated region and the ends of enlarged mode field, the special type fibre maintains constant optical characteristics (cut-off wavelength and numerical aperture), so as to convey and suppress the higher modes travelling in the cladding.

It is apparent that numerous modifications can be made to the method and apparatus for forming fibre optic attenuators according to the present invention, without leaving the principles of novelty contained in the inventive idea, it being also apparent that in the practical implementation of the invention, the materials, the forms and dimensions of the illustrated details can be chosen at will according to requirements, and that these can be replaced by others technically equivalent.

We claim:

1. A method for forming fibre optic attenuators (201) with spectral response independent (within a substantially narrow tolerance) of the incident radiation wavelength, which uses at least one piece of optical fibre (30), and comprises the following steps:

heating said optical fibre (30) to the softening point of silica, of which it is composed;

manipulating the piece of said optical fibre (15) within a system (16), during the heating of and subsequent to the softening of the silica;

during manipulation, verifying the progressive increase in attenuation over its initial value by an apparatus for actively monitoring the power of the optical signal transmitted at at least two wavelengths of interest in telecommunications, these being different from each other and lying within the range of values for which said utilized optical fibre (30) is monomodal;

inserting said piece of optical fibre (15) into at least one attenuating body (20), lapped on at least one side, for connection to optical connectors abutting against the terminal parts of said optical fibre (30) and assembled into the outer casing (10) of at least one attenuator (201);

by means of a test bench comprising a source (31) of white light radiation, reference pins (34, 35), a measurement sleeve (33) and an optical spectrum analyzer (32), measuring the spectral attenuation of said attenuator (201) over the entire wavelength range of interest, characterised in that the piece of optical fibre (15) is manipulated by applying to said piece of optical fibre (15) compressive stresses and/or relaxation, to induce the formation of at least one region (23) of diameter substantially similar to or greater than the diameter of the optical fibre (30), which maintains rectilinear geometry.

2. A method for forming fibre optic attenuators (201) as claimed in claim 1, characterised in that before inserting said piece of optical fibre (15) into said attenuating body (20), a further step is carried out consisting of heating said region

(23) of diameter greater than the diameter of the optical fibre (30), in the absence of mechanical stresses, to facilitate the attainment of the desired attenuation value.

3. A method for forming fibre optic attenuators (201) as claimed in claim 2, characterised in that the increase in the diameter of said region (23) over the diameter of the optical fibre (30) occurs in the manner of a homothetic transformation, without altering the optical-geometrical characteristics achieved in each section of the optical fibre (30).

4. A method for forming fibre optic attenuators (201) as claimed in claim 1, characterised in that the ratio of the core diameter to the cladding diameter of the optical fibre (30), before and after said compressive stressing, remains unaltered.

5. A method for forming fibre optic attenuators (201) as claimed in claim 1, characterised in that as a result of the heating and compressive stressing and/or relaxation of said region (23) of optical fibre (30), doping material diffuses from the core of the optical fibre (30) to the cladding, simultaneously with the formation of said region (23) of diameter greater than the diameter of the fibre (30), enabling a plurality of electromagnetic field modes to be propagated.

6. A method for forming fibre optic attenuators (201) as claimed in claim 1, characterised in that the deformation of said region (23) induces deformation within the core of the optical fibre (30), enabling a plurality of electromagnetic field modes to be propagated.

7. A method for forming fibre optic attenuators (201) as claimed in claim 1, characterised in that said attenuator (201) has a spectral response independent of the wavelength of the incident signal (within a substantially narrow tolerance) within the wavelength range between 1200 nm and 1650 nm, and hence does not generate modal noise at the optical connections.

8. A method for forming fibre optic attenuators (201) as claimed in claim 1, characterised in that said piece of optical fibre (30) is of special type (25), ie having a numerical aperture greater than that of monomodal fibres and a cut-off wavelength less than the lowest operational wavelength, after manipulation said piece of special type (25) being joined to two pieces of optical fibre (30) of standard type (21), so that the standard type optical fibre (21) interfaces with the optical connection connectors, which, containing optical fibres (30) of standard type (21), generate low connection losses and facilitate coupling to a transmission system.

9. A method for forming fibre optic attenuators (201) as claimed in claim 1, characterised in that said piece of optical fibre (30) is of special type (25), ie having a numerical aperture greater than that of monomodal fibres and a cut-off wavelength less than the lowest operational wavelength, after manipulation said piece of special type (25) being heated in the regions in which it is joined to two pieces of optical fibre (30) of standard connection type (26), so that the mode field diameter is greater in correspondence with said joining regions of the optical fibre (30) of special type (25) than within the rest of the optical fibre (30), with minimizing of external connection losses.

10. A method for forming fibre optic attenuators (201) as claimed in claim 1, characterised in that the optical fibre (30) is heated by a current-fed electric arc for a predetermined time.

11. A method for forming fibre optic attenuators (201) as claimed in claim 1, characterised in that said piece of optical fibre (30) is of standard type (21), the insertion of said piece into said attenuating body (20) being preceded by the following further steps:

pre-assembling said piece into the attenuating body (20), leaving at least one portion of it free about said region (23) of diameter greater than the diameter of the optical fibre (30);

reducing the diameter of said piece portion by chemical attack with hydrofluoric acid for a predetermined time;

coating the chemically attacked portion with a layer of high refractive index resin, so that the modal noise generated by interference between the higher and fundamental modes of the electromagnetic field, in correspondence with the optical connections and/or the joints between pieces of optical fibre (30), is reduced compared with known methods, the higher modes of the electromagnetic field being conveyed along said resin layer and suppressed.

12. A method for forming fibre optic attenuators (201) as claimed in claim 1, characterised by being able to be automated by an electronic processor.

13. A method for forming fibre optic attenuators (201) as claimed in claim 1, characterised in that the time required for forming said region (23) of diameter greater than the diameter of the optical fibre (30) is less than the time required for forming said region (23) in accordance with the known art.

14. An apparatus for forming fibre optic attenuators (201) used for implementing the method claimed in claim 1, characterised by comprising:

at least two LEDs or laser diodes (11, 12) which generate at least two optical signals of suitable wavelengths for the operating characteristics of the attenuator;

a first wavelength division multiplexer (13) which combines said optical signals and conveys them along a monomodal fibre connected to said piece of optical fibre (15) by connectors (14, 14A), in order, during manipulation within a system (16), to verify the progressive increase in optical signal attenuation over the initial value, by actively monitoring the transmitted power;

a second wavelength division multiplexer (13A) which receives as input the optical signal leaving said piece of optical fibre (15) and has two outputs connected to two sensors (17, 18), which are chosen such that their responses are identical and such that they are able to separately measure the power of said optical signals of wavelengths suitable for the attenuator operating characteristics, present at the output of said second multiplexer (13A).

* * * * *